United States Patent
Barmes et al.

(10) Patent No.: US 10,339,147 B1
(45) Date of Patent: Jul. 2, 2019

(54) DATA SET SCORING

(71) Applicant: Amazon Technologies, Inc., Seattle, WA (US)

(72) Inventors: Christine Joanna Barmes, Seattle, WA (US); Samuel Ytzhak Donnelley, Auburn, WA (US); James Edward Kinney, Jr., Seattle, WA (US); Alessya Labzhinova, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 15/189,735

(22) Filed: Jun. 22, 2016

(51) Int. Cl.
*G06F 17/30* (2006.01)
*G06F 16/2457* (2019.01)
*G06Q 30/06* (2012.01)
*G06N 20/00* (2019.01)
*G06F 16/9535* (2019.01)

(52) U.S. Cl.
CPC .... *G06F 16/24578* (2019.01); *G06F 16/9535* (2019.01); *G06N 20/00* (2019.01); *G06Q 30/0601* (2013.01)

(58) Field of Classification Search
CPC .......... G06F 17/3053; G06F 17/30867; G06N 99/005; G06Q 30/0601
See application file for complete search history.

(56) References Cited

U.S. PATENT DOCUMENTS

| | | | | |
|---|---|---|---|---|
| 7,676,427 | B1* | 3/2010 | Bongiorno | G06Q 10/10 705/35 |
| 9,529,893 | B1* | 12/2016 | Deng | G06F 17/30867 |
| 9,727,644 | B1* | 8/2017 | Teng | G06F 17/30861 |
| 2008/0201348 | A1* | 8/2008 | Edmonds | G06Q 30/02 |
| 2012/0158678 | A1* | 6/2012 | McGraw | G06Q 30/02 707/694 |
| 2014/0032518 | A1* | 1/2014 | Cohen | G06F 17/30598 707/706 |
| 2016/0147844 | A1* | 5/2016 | Adderly | G06N 5/02 707/725 |
| 2017/0364561 | A1* | 12/2017 | Wu | G06F 17/30498 |

* cited by examiner

*Primary Examiner* — Sherief Badawi
*Assistant Examiner* — Lahcen Ennaji
(74) *Attorney, Agent, or Firm* — Thorpe North & Western, LLP

(57) ABSTRACT

Technology is provided for data set scoring. In one example, a method includes analyzing first and second characteristics of a data set. The first and second characteristics represent a quality of data values in the data set. At least the first characteristic is independent of the data values in the data set. The method further includes assigning a score to the data set based on the first and second characteristics. The data set may be ranked against a plurality of other data sets based on the score. The score of the data set may be provided together with a scoring scale to enable a determination of the quality of the data values based on the score.

20 Claims, 7 Drawing Sheets

DATA SET SCORING

BACKGROUND

The amount of electronic data collected and stored in computing data stores by various entities is increasing year over year. The data collected, sometimes referred to as "big data", may include data sets that may be beyond the ability of commonly used software tools to manage and process the data sets within a reasonable time period due to the data sets size. Data stores have been developed to better handle large data sets, such as non-relational data stores and distributed data store systems. These data stores may be used to capture and store large data sets in the areas of science, education, government and business, where persons working in these industries may encounter computing limitations when utilizing data due to the larger amount of data encountered.

As data is gathered by an increasing number of computing devices and systems, opportunities to utilize the data may also increase. For example, large amounts of financial data, geological data, Internet of Things (IoT) data, recommendation data, fraud detection, purchasing analytics, click streams, and other large data stores may be offered so that the data stores may be publicly accessible (e.g., for a fee) to parties other than the original creators of the data. However, when large data sets are available the value of the large data sets is not always clear due to issues with completeness, usefulness, age and other unexpected issues.

DETAILED DESCRIPTION

Figure 1:
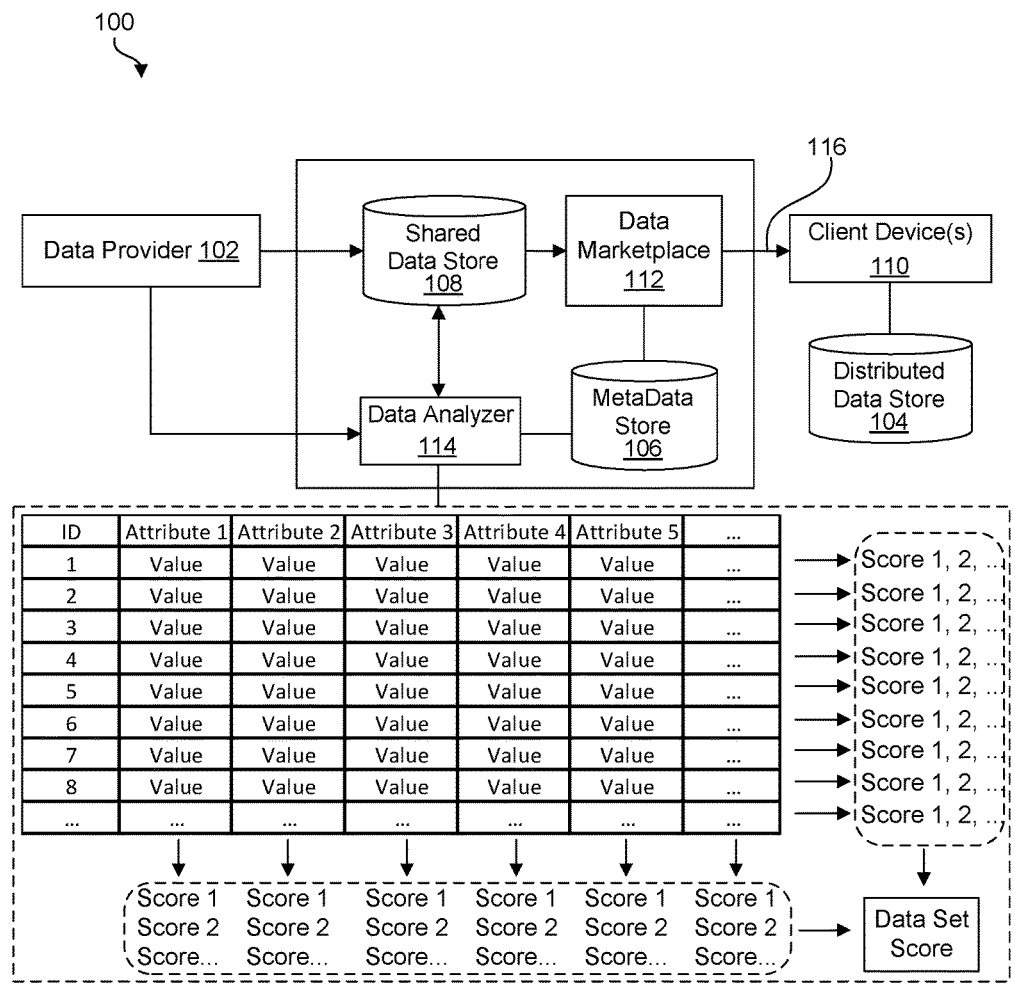
FIG. 1 is a diagram illustrating an example system for distributing and scoring data sets within a networked environment.

A technology is provided for data set scoring. In one example, a method includes analyzing first and second characteristics of a data set. Some example characteristics include completeness, dimensionality, freshness, consistency, and the like. The first and second characteristics represent a quality of data values in the data set. At least the first characteristic is independent of the data values in the data set. The method further includes assigning a score to the data set based on the first and second characteristics. The data set may be ranked against a plurality of other data sets based on the score. The score of the data set may be provided together with a scoring scale to enable a determination of the quality of the data values based on the score. The scoring scale may explain or provide context to the score. For example, the scoring scale may provide ranges of scores with explanations of the level of quality to be expected with each score. As another example, the scoring scale may simply list the range of possible scores and leave interpretation of the score to a customer.

In a more specific example, a method for ranking a data set in search results is provided. The method includes analyzing first and second characteristics of the data set, each of the first and second characteristics representing a quality of data values in the data set. At least the first characteristic may be independent of the data values. In other words, the specific data values may not affect the resulting score for the characteristic and analysis of the characteristic (e.g., completeness, dimensionality, freshness) may be the same regardless of specific data values (e.g., whether a binary value is a '0' or a '1' does not affect a freshness analysis of how recently that '0' or '1' was updated). The method may include assigning a first characteristic score to the first characteristic and a second characteristic score to the second characteristic. The method may also include assigning a data set score to the data set based on the first and second characteristic scores. The data set may be ranked against any number of other data sets based on at least one of the scores (i.e., the first characteristic score, the second characteristic score or the data set score). A search request may be received from a data marketplace for data sets matching a query. The data set and the other data sets may be provided for access through the data marketplace based on the ranking and in response to the search request. For example, an electronic page may list the data sets in ranked order of the data set scores in the data market place to enable a customer to select a data set that corresponds to the customers searching criteria.

Expressing data set quality through one or more scores may enable customers to evaluate and use data more effectively. By creating a data quality scoring system, customer expectations regarding the value and utility of data sets may be established. The data set scoring may serve as a useful differentiator in a data marketplace for customers and may differentiate between multiple data sets that are being considered for purchase or use. The scores may assist the data analyst in determining whether the data set may be useful for prediction of future data, for explanation of past data, etc.

FIG. 1 is a diagram illustrating a high level example of a system 100 for scoring data sets and for distributing data sets via a data marketplace 112. The system 100 may include a data provider 102 that provides a data set to a shared data store 108 in the system where the data set may be analyzed, scored and/or purchased by way of the data marketplace 112. The data set may be any suitable format. For example, the data set may be a NoSQL database, a comma delimited file, a relational database, a graph database, a columnar data base, a data stream, etc.

The data provider 102 may include a data store (not shown) that contains a data set that is to be made available to customers through the data marketplace 112. One example of a shared data store 108 that may be used at the data marketplace to store the data set from the data provider 102 as well as data sets from other data providers may be a distributed data store. A distributed application that is part of the distributed data store may process large data sets with a parallel distribution and processing method on a distributed data store, such as a MapReduce application, which may be used to retrieve and organize a data set. The resulting data may be made available to various customers via the data marketplace 112.

A client device 110 may access the data marketplace 112 through a communications network 116, whereupon a customer using the client device 110 may be presented with data sets or data topics related to data of data sets that may be available to the customer to acquire. In one example, data sets may be associated with metadata that may be used to identify the data sets. The metadata may include a description of the data within the data set (e.g., Company XYZ Stock Trading Data), a date associated with the data (e.g., Mar. 6, 2009) and/or a URL or data store name that specifies a location of the data set within the shared data store 108. The metadata may also include one or more scores representing a quality of the data. The scores may be assigned at the data marketplace using a data analyzer 114. The metadata may also include data about the data provider 102. The metadata may include uses of a dataset from the data provider 102, where the uses may be identified by the data provider 102 or by the data marketplace when a customer purchases a dataset or obtains the dataset from other suitable sources. The metadata may also include citations that have been made to the dataset in academic literature or any other such data that may be useful to a customer in determining whether to purchase a dataset.

The metadata may be stored in a metadata store 106 that may be independent of the data sets, and/or the metadata may be included in a data set. When searching for a data set, the metadata may be used to locate the data set. For example, a data marketplace user interface may enable a customer to perform a search for specific metadata associated with the data sets or search the shared data store 108 for metadata contained in a data set or a range of data sets. When searching for one or more data sets, the metadata may be read and upon finding metadata associated with a data set that matches parameters of the search, the metadata for the data set may be returned to the data marketplace user interface and displayed to the customer.

When a customer selects a data set via the data marketplace 112, a reference (e.g., a URL) to the data set may be generated and included in a manifest file. The manifest file may contain a reference to each data set selected by the customer or the data sets related to the metadata associated with the topic selected by the customer. The reference, in one example, may be a URL (Uniform Resource Locator) or the reference may be network address and authentication credentials. The URL may provide a location of a data set and may contain an electronic signature and an expiration date and time. After including the URL in the manifest file, the manifest file may be provided to the client device 110 via the communications network 116.

After receiving the manifest file, the manifest file may be provided to a shared data store 108 that may be accessible to the client device 110. In one example configuration, the client device 110 may authenticate to a distributed data store 104 that may read the manifest file and identify the URLs contained in the manifest file and may then direct the nodes of the distributed data store 104 to retrieve the data sets located in the shared data store 108 using the respective URLs.

When retrieving data from a data set located on the shared data store 108 using a URL, the information included in the URL may be authenticated prior to accessing and copying the data from the data set. For example, the URL may contain an electronic signature that has been created or encrypted using a private key held by the data marketplace 112. The electronic signature may be verified by decrypting the electronic signature using a public key. Moreover, the URL may contain an expiration date and a time (in addition to an electronic signature). The expiration date and time may be compared to a current system date and time, and if the expiration date and time are later than the current system date and time, and if the electronic signature is authenticated, then the data set(s) may be copied from the shared data store 108 to the customer's distributed data store 104.

In a use case scenario for the data set(s), a data scientist may attempt to extract meaning from data by spending a significant amount of time manually analyzing a data set for cleanliness, data coverage, etc. After selecting a data set for use, the data scientist may then spend time cleaning up the data set for the intended use. When shopping for a data set via a data marketplace 112 that may have a large number of data sets available for purchase, a data scientist may be unable to realistically evaluate the utility or relevance of a meaningful number of potentially relevant data sets. Accordingly, the present system 100 may provide a data analyzer 114 to score data sets in a number of dimensions and provide one or more scores of the data set as a rating to indicate how well a data set does what the data provider 102 alleges about the data set in the data marketplace 112 marketing materials.

The data analyzer 114 may be configured to programmatically score the data set from the data provider 102 without human involvement. The present technology may provide multiple characteristics related to scoring. One aspect of the data scoring relates to assigning the scores. The scores may be assigned at the data marketplace 112, or the scores may be assigned by the data provider 102 or any other suitable location. The scoring aspect may be part of a centralized or non-centralized system. Another aspect of the technology relates to inclusion of a scored data set in the data marketplace 112 and may involve a centralized system. When the data set is made available in the data marketplace, the data analyzer 114 may compare data sets, analyze how data in data sets is consumed, etc., and may add additional heuristics.

The data analyzer 114 may analyze any number of characteristics of the data set or of subsets of the data set and may assign one or more scores based on the characteristics. The characteristics may represent different quality aspects of the data set. The scores of the characteristics may be weighted and/or combined to form a data set score that may represent an overall quality of the data set. The quality of the data set may be indicative of how well the data set is likely to satisfy a customer's use case. By making the data set score and/or characteristic scores available through the data marketplace 112, a customer may quickly and easily understand the quality of the data set and may compare the data set against other data sets without expending an extensive amount of time.

One example characteristic of the data set that may be analyzed by the data analyzer 114 may be completeness. For dynamic data, completeness of past data in a data set may be indicative of data that will go into the data set in the future. The data analyzer 114 may look for completeness of the data, such as whether particular data in a row or column is completely provided, whether the data is missing in some cases, etc. When data values for an attribute are missing, the data analyzer 114 may attempt to determine whether the missing value indicates that the data value is: not known, not applicable, null, or something else. This determination may be made using instructions from the data provider 102, which may optionally be included in the metadata. Alternatively, the determination may be made using the data set itself. For example, if some data values are missing but other data values indicate null and/or not applicable, then an assumption may be made that the missing data value is not known. Inferences also may be drawn as to whether missing data values indicates not available and/or not applicable. For example, if the data set includes two values that are similar (e.g., N/A, Null, etc.) that could be null, then the system may infer that for this data set these two values represent separate concepts. As described previously, the data set schema or metadata may also indicate how to treat missing, null and/or other values. In this and other examples, the dataset is described in terms of rows and columns such as may exist in many well-known types of data stores, but the present technology may be used with any of a variety of other types of data stores, such as object oriented data stores, NoSQL data stores, etc. as is discussed in additional detail later. In such other examples, rather than 'rows' and 'columns', data may be identified, for example, by 'attributes' and 'values' or other suitable designators appropriate for the type of data store involved.

The data analyzer 114 may iterate over the dataset on per column or per row level and determine a completeness score. For example, the completeness score may be a percentage score indicating what percentage of the column, row and/or data set as a whole is complete. In one example where weather data comprises the data set being analyzed, various data characteristics may have been available for years such as temperature and humidity, but barometric pressure may have been added within the past few months. The completeness scores for temperature, humidity and barometric pressure may be indicative of this information where temperature and humidity may have very high percentages while barometric pressure may have a significantly lower percentage of completeness.

In some cases where the data analyzer 114 determines there is an issue with completeness (i.e., data set has greater than a threshold level of incompleteness), the data analyzer 114 may take one or more predetermined actions. For example, the data provider 102 or other entity may be notified of the gaps or incompleteness of the data in order to fill in the gaps. As another example, the data analyzer 114 may fill in some gaps programmatically using trends, inferences, etc.

As another example characteristic, the data analyzer 114 may analyze the dimensionality of the data set. For example, the data analyzer 114 may determine the number of columns versus the number rows. Dimensionality may be useful for data marketplace 112 customers. For example, with weather data where a data set includes 200 entries with 1000 attributes. In this case, attributes is large and the data set is wide compared to length. The quality of the attributes may be considered low because there is a small representation of each attribute. In other words, the data set provides a small sample per attribute. Inferring data or modeling data from attributes may be difficult because of the small sampling number. As an alternative example, a data set having 50,000,000 entries with 50 attributes would be much a better representation of the attributes and provide a better foundation for prediction, modeling or other use cases.

One characteristic the data analyzer 114 may analyze is freshness of the data set. Freshness may indicate how frequently the data is updated. For example, monthly updated data may be scored lower than data that is updated hourly or minute-to-minute. For data streams the data analyzer 114 may look at how often new data is published. For static data, such as a catalog, the data analyzer 114 may evaluate how often entries are updated or added in the catalog. Freshness of updates or verifications of data that have been previously presented may be a subset of freshness. For example, if a data set is updated every day but 95% of items in the data set have not been updated in the past year, the data set may be scored differently than a scenario where 50% of items in a data set are updated every day. Using weather data as an example, weather is known to vary regularly and is desired have regular updates. The more frequent the weather data is updated, the higher the freshness score may be assigned. The less frequent the weather data is updated, the lower the freshness score may be assigned.

For a given portion of the data set, constant updates may be valuable while for other part of the data set constant updates may be bad. In other words, the data analyzer 114 may analyze characteristics, such as freshness, completeness, etc., at the column and data element level as well as at the dataset level. This may be more useful in some cases than for the entire dataset. In other words, maybe freshness of a column may be more useful than freshness of an entire dataset. The scores for columns, etc. and for the different characteristics may roll up to the dataset score. Continuing with the weather example, if the data indicates that temperature has not changed in a week, such an occurrence may be unusual. However, a stress meter measuring stress on a structure may be different and may be expected to remain fairly constant over months or years. Where constant values are appropriate, the data analyzer 114 may look at whether updates are being received on a regular basis. If there is a time dimension to the data in the data set, such as if the data set includes time stamps, the data analyzer 114 may look at the range of time stamps. The data analyzer 114 may generate a model to look for consistent fluctuation of data within a range, to determine whether there have been major shifts at any point in time, etc. The model may be useful in identifying a width of the range and the fluctuations within the range, and whether the range itself has changed a lot over time. This type of modeling may also be presented to the customer at the data marketplace 112 together with the score of the data set.

The data analyzer 114 may determine whether the data set is dynamic or static. The dynamic or static nature of the data set may be determined intrinsically by evaluating the frequency of updates, etc., or may be determined extrinsically such as by querying the data provider 102. The data analyzer 114 may create a schema for the data provider 102. The more information the data provider 102 provides about what the data is, the better the data analyzer 114 is able to determine what the data should be, such as to understand the period and variance of data values, data updates, etc.

The data analyzer 114 may analyze consistency of the data in the data set. Consistency may be a measure of when the dataset is updated or whether the data set stays with a same schema or changes frequently. If the schema is changing frequently and a customer intends to rely on the data set, frequent schema changes will mean more manual work. Thus, more stable consistency may be scored higher than data sets with poor consistency. Whether for consistency or other characteristics, the characteristic scores or overall data set score may indicate quality of data, which may indicate how much manual work may be involved in using the data set.

The data analyzer 114 may analyze predictiveness of the data. In other words, the data analyzer 114 may look for correlations in the data. The predictiveness score may indicate the percentage of data that is correlated to other data in the dataset and may identify those attributes which are correlated to other attributes. When using data to build a prediction and there are many features or predictors, adding more data that is correlated in the same way as existing data may not assist in building the prediction. The data analyzer 114 may look for correlations programmatically. In one example, the data analyzer 114 may look for correlations that are so highly correlated, one of the attributes could be eliminated without substantially degrading the quality or predictiveness of the data. A threshold score may be used for determining whether something is highly correlated. The data analyzer 114 may identify attributes which are uncorrelated and completely random or unrelated such that even with a lot of data values there is unlikely to be a correlation. A threshold score may be used to determine what is uncorrelated. What remains after identifying the highly correlated and uncorrelated attributes is usefully correlated attributes. The predictiveness score may optionally be based on the usefully correlated attributes. In one example, the predictiveness score may be presented to the customer as a percentage of the data set that is uncorrelated, a percentage that is usefully correlated, and a percentage that is highly correlated.

The data analyzer 114 may analyze a conformity of the data set to a schema. Most data does not come with a SQL database to validate where data conforms to a schema. The schema describes how many columns are expected, what types of attributes are expected, etc. The schema may be provided by the data provider 102 or may be determined by the data analyzer 114. The schema may indicate that some columns include categorical data. In this example case, if there are as many entries in the data set as there are columns, the entries are clearly not categorical and the data set may be assigned a low conformity score. The data analyzer 114 may attempt to load the data set into a database using the schema. Depending on how successfully the data analyzer 114 is able to load the data set into the database, a conformity score may be assigned. The conformity score may be indicative of how much time a data scientist is likely to spend adjusting the data set to conform to the schema. By providing a conformity score, the data marketplace may enable customers to choose the right datasets to work with and to invest time wisely. Data from a relational database may have perfect conformity score, while data which does not at all follow the schema (or any schema) may have a '0' conformity score.

Scores for the various characteristics may be assigned based on a type of attribute. For example, attributes with 100% numerical high precision may be best, categorical entries may be less useful than numerical, and freeform entries may be less useful than categorical entries. The data analyzer 114 may use rules to identify the numerical entries, categorical entries and freeform entries. Freeform attributes are difficult to use to make predictions. If a form asks a user to type a color, that is a freeform entry. If the user is asked to select a color from a 10 tone color scale/wheel, that may be categorical. If a color entry is a specific point on a color spectrum represented by an RGB or hex value, that color entry may be numeric.

Various example characteristics have been described that may be analyzed and scored by the data analyzer 114. The scores may be combined using linear weighting or other existing weighting schemes to determine the data set score. For example, completeness may be weighted greater than dimensionality which may be weighted greater than freshness, etc. Because some customers may have very diverse data, the scoring and weighting rules of such data may be more lenient to make sure the scoring does not result in too much data being scored low or discarded in search results.

In the data marketplace example where the data marketplace is in a service provider environment, and where the data is used in the service provider environment, the data analyzer 114 may analyze additional characteristics which may be useful for customers. For example, the data analyzer 114 may look at which data sets are used and how the data sets are utilized in practice (e.g., for predictiveness). For example, the data analyzer 114 may analyze data provider quality, data set consumability and/or machine learning adaptability.

Data provider quality may indicate an inferred quality of the present data set based on past data sets provided by the data provider 102. For example, if a data provider provides a new dataset after providing a number of datasets in the past that were high quality, the present data set may be inferred to similarly be of high quality. The data provider quality score may adjust the data set score up or down. For example, the data provider quality score may be weighted and combined together with the characteristic scores to produce the data set score. As another example, the data set score may be determined and then may be adjusted up or down based on the data provider score. For example, a data provider score may have three values—positive, neutral or negative. In this example, a positive value may result in adjustment of the data set score upward by 5 points on a scale of 0-100 for the data set score, while a negative value may result in a negative 5 point adjustment and a neutral score (i.e., insufficient data provider history) may result in a 0 point adjustment.

Data set consumability may indicate how many customers are using the data set. For example, a large number of customers using the data set may indicate the data set is more consumable than another data set with fewer or no customers. The data set consumability score may be used to adjust the data set score. However, a lack of customers using the data set may not necessarily indicate that data in the data set is useless. Thus, optionally, the data consumability score may adjust the data set score upward from the data set score determined from the other characteristic scores but may not adjust the data set score determined from the other characteristic scores downward. The number of customers using the data set may affect the degree of upward adjustment of the data set score.

Machine learning is a common use of data sets. A machine learning adaptability score may indicate whether customers are using the data set to create or publish models based on machine learning and/or whether the data set is being used as the basis for other high quality datasets. Feedback or reviews on the quality of dataset received via the data marketplace 112 may feed back into the machine learning adaptability score of the dataset. By analyzing whether a data set is used and considered suitable for a predictive model for another customer, a customer looking at the data set may be able to determine that the data set may be suitable for the customer's machine learning model. The data analyzer 114 may identify machine learning model types used with the data set or may run a few basic machine learning models on the data set to see what scores are obtained. The machine learning adaptability score may be assigned to the data set to adjust the data set score upward or downward.

Figure 2:
FIG. 2 illustrates a graphical user interface for a data market place in an example system for scoring data sets.

FIG. 2 is a diagram illustrating an example data marketplace page 210 for purchasing a data set or access to a data set. The data marketplace may be implemented in a service provider environment, such as by using one or more physical or virtual computing devices that may be in communication with a number of client devices by way of a communications network, such as the Internet. The system may also include a data store to store the data sets that may be accessible to a computing device and the client devices.

The data marketplace page 210 enables a customer to enter one or more search terms in a search query field 215 to find data sets. Navigation and/or filtering options are available to filter by category 220, publisher 225, data set score 230 and so forth. The page 210 may also include a scoring scale 235 that explains the scoring scale and how to interpret the scores. Results 240 of searching or filtering data sets may be provided for display to a customer. The results 240 may include an identifier 245 providing an identity of the data set, a description 250 of the data set, the score 255, etc. The results 240 may include sorting options to sort by features such as category, score, publisher, price, etc. In this example, a single data set score is shown for each data set and the results 240 are sorted by score. However, as has been described, any of a number of different scores may be assigned to the data set and the page 210 may enable a customer to search, sort, filter, etc. according to characteristic scores, including at different levels of granularity (e.g., at the data set level, on a per attribute level, etc.). Also not shown, the navigation and filtering options may include additional options for filtering by machine learning models or model types. Additionally, any other useful information that may be included in, derived from or related to the datasets or data providers may be provided for display. For example, the results 240 may also list citations in academic literature to the datasets. Selecting the score 255 or the link 260 may show which characteristics were considered in scoring the dataset to enable a customer to understand how the score was determined. Any number of other variations may also be implemented to make the various features of the present technology accessible for use in finding a suitable data set in the data marketplace.

When a customer clicks on the scoring scale 235 to learn more about the scoring, the customer may be presented with a page describing the different characteristics used for obtaining characteristic scores and how these characteristic scores affect the data set score. For example, the page may explain that the data set score is a number assigned to a data set that indicates the quality of the data which the score represents. The number is calculated based on a set of characteristics, such as those examples which have been described:

1. Completeness—what proportion of entries in each column are missing values (blank, n/a);
2. Dimensionality—what is the number of columns vs. the number of rows in the dataset;
3. Freshness—how often is the data updated, time since last update;
4. Consistency—how consistent is the schema across dataset snapshots;
5. Predictiveness—how predictive is the dataset, which may be determined by:
   a. How many categorical attributes vs. text attributes are in the dataset;
   b. What is the variance of numerical attributes in the dataset; and
   c. What is the correlation across attributes in the dataset;
6. Conformity—how does the data conform to the schema that is provided;
7. Schema—quality scores based on the schema of the data (i.e. number of free-form attributes vs. numerical vs. categorical); and
8. Uniqueness—how many unique entries are in the data.

Each characteristic may be evaluated through a set of analysis rules, which output a numeric value score. The overall data set score may be a weighted linear combination of individual scores. The method for evaluating each characteristic as well as the linear combination may be fine-tuned to meet business-specific needs for the data marketplace. Iterative testing may be a part of the analysis that results in repeated testing of the data sets to ensure score consistency or to account for changes in the data set over time. Iterative testing may be performed at predefined intervals or upon occurrence of predefined events, such as an update to the data set.

Additional characteristics may be taken into account for computing the data set score for an environment where scorable data is governed and regulated by a centralized system for tracking data quality. Some of these characteristics include:

9. Data provider quality—calculated based on the scores of the dataset this provider supplies;
10. Dataset consumability—calculated based on the number of customer who use the dataset; and
11. Machine learning adaptability—calculated based on the number of machine learning solutions that use the dataset. With machine learning solutions a value of individual attribute can be determined based on how the features for the machine learning solution were constructed.

Based on the information known at the centralized system, the marketplace may provide information through the page 210 that a particular data set is likely to work well with XYZ machine learning model but may not work as well with ABC machine learning model.

Another example characteristic that may be analyzed and scored is data accuracy. For example, customers may provide feedback on accuracy of the dataset and the feedback may be used in scoring the dataset. The feedback may be in the form of a score or rating or may be text or another form of feedback from which a score may be derived. The present technology may identify some accuracy issues when evaluating other of the characteristics, but human verification in the form of customer feedback may validate or inform an accuracy determination. The following are some example instances of accuracy issues that may be encountered and which may be valuable to include in the score:

Map data—Map providers may have maps for a specific area that is complete, but when the map dataset is refreshed then some data may get dropped in the refresh process, resulting in parts of the dataset being missing. If the 'completeness' characteristic was already scored and then the 'freshness' was scored, the dataset may have a high score as a result, but the map may be inaccurate because data was dropped in the refresh.

Color data—Products may be photographed and the color data may be collected from the photo. If the product was photographed in poor lighting conditions the hex color selected may not accurate based on optimal lighting conditions. The data may be complete and fresh but what is advertised as being hex color #0B0B3B may instead be hex color #0000FF.

Translation data for products—A data factory may offer product data for consumer electronics products in five different languages. The data may be complete, useful and fresh. Translations provided in French, German and English may be good but the translations in Japanese and Arabic may be very poor and not accurate from a native speaker's perspective.

In each of the example instances described above, a customer who used/purchased the product data, API, etc. may provide accuracy feedback and that feedback may be incorporated into the dataset score.

The data marketplace may enable a consistent implementation of the data set scoring across data sets from a variety of data providers and may unify the definition of data quality. The data set score may enable customers at a glance to determine a relative quality of a particular data set relative to another data set. The data set score may be provided in search results and may be used to filter or sort the search results.

By using a scoring scale that is widely known or accepted, customers and potential customers may readily recognize the quality of the data set based on the score alone. While the page 210 of FIG. 2 illustrates a scoring scale from 0-1000, any number of other variations may be selected, such as to score the data sets from 1-100 or 35-90 or with alphanumeric scores/grades such as A-F, etc. The page 210 may enable a customer to click on the data set score 255 or a link 260 included in the search results to view data set details or characteristic scores, including enabling a customer to drill down from the data set score into individual characteristic scores of individual rows or attributes. Customers may be enabled to sort and filter within characteristics since some characteristics may be more important to some customers than others (e.g., completeness vs. dimensionality).

The data sets stored in the data store may be accessible to those who may wish to acquire one or more of the data sets. In one example, customers may acquire rights to obtain a set file via the data marketplace. The data marketplace may be accessible by way of a user interface that allows a customer using a client device to select a data set to which the customer wishes to acquire rights.

After one or more data sets containing data that the customer may wish to acquire are selected, a manifest file may be created. A URL may be generated for each data set selected and may be inserted into the manifest file. The URL may contain additional information, such as information that identifies a customer and information that can be used to determine access to the data set. In one example, the additional information included in the URL may be an electronic signature that identifies a customer and an expiration date and time that indicates when the data set may no longer be accessible to the customer. The manifest file may act as a license to allow associated data sets to be accessed and copied. In one example, after creating the manifest file, the manifest file may be provided to the customer. The customer may then engage a data copy module that uses the URLs contained in the manifest file to access respective data sets and to copy the data from the data sets' initial location to a customer's data store. In one example, the data from the data sets may be copied to a distributed data store where a data copy module in the data marketplace may instruct a node within a distributed data store cluster to access a data set using an associated URL from the manifest file and copy the data to the distributed data store cluster. Once the data from the data set(s) has been copied to the customer's data store, the customer may make use of the data. As a specific use example, a customer may allow an application (e.g., a distributed processing application) to generate computing results using the data from the data sets as input.

The data marketplace may provide an interface by which a customer may access the data marketplace. FIG. 2 illustrates a graphical user interface. However, any suitable type of interface may be used, such as a command line interface, for example. When searching for a data set, metadata associated with the data set may be used to identify the data set and return a description 250 of the data set with the results 240 of the search. As will be appreciated, a data marketplace may be a proprietary data marketplace that is provided within a system or may be a third-party data marketplace that communicates with the system via an API (application programming interface).

A client device used by a customer may include any device that may be capable of sending and receiving data over the Internet. A client device may comprise, for example a processor-based system such as a computing device. Such a computing device may contain one or more processors, one or more memory modules and a graphical user interface. A client device may be a device such as, but not limited to, a desktop computer, laptop or notebook computer, tablet computer, mainframe computer system, handheld computer, workstation, network computer, or other devices with like capability. A client device may include a browser that may enable the client device to communicate with a data market module provided by a computing device and with a distributed data store cluster. The client device may include a display, such as a liquid crystal display (LCD) screen, gas plasma-based flat panel display, LCD projector, cathode ray tube (CRT), or other types of display devices, etc.

The various processes, modules and/or other functionality contained on the physical or virtual computing devices(s) used to implement the data marketplace may be executed on one or more processors that are in communication with one or more memory modules according to various examples. The computing device may comprise, for example, of a server or any other system providing computing capability. Alternatively, a number of computing devices may be employed that are arranged, for example, in one or more server banks or computer banks or other arrangements. For purposes of convenience, the computing device is referred to in the singular. However, it is understood that a plurality of computing devices may be employed in the various arrangements as described above.

Various data may be stored in a data store that is accessible to the computing device. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store and the distributed data store cluster may include storage systems such as a SAN (Storage Area Network), cloud storage network, volatile or non-volatile RAM, optical media, or hard-drive type media. The data store may be a distributed data store cluster and may be representative of a plurality of data stores as can be appreciated.

A distributed data store cluster may comprise a group of computing devices, physical or virtual, with associated data stores. A distributed data store cluster may be one of a plurality of distributed data store clusters within a distributed database management system. The clusters and nodes of a distributed database management system may be located in a single physical location or may be dispersed over a network of interconnected computing devices. A network may be utilized to interconnect the nodes of the distributed data store cluster with other components. The network can be a local area network (LAN) which may be connected to a Wide Area Network (WAN) and the Internet enabling a customer to access the distributed data store cluster. Components utilized for such a network may depend at least in part upon the type of network and/or environment selected. Communication over the network may be enabled by wired or wireless connections and combinations thereof.

Figure 3:
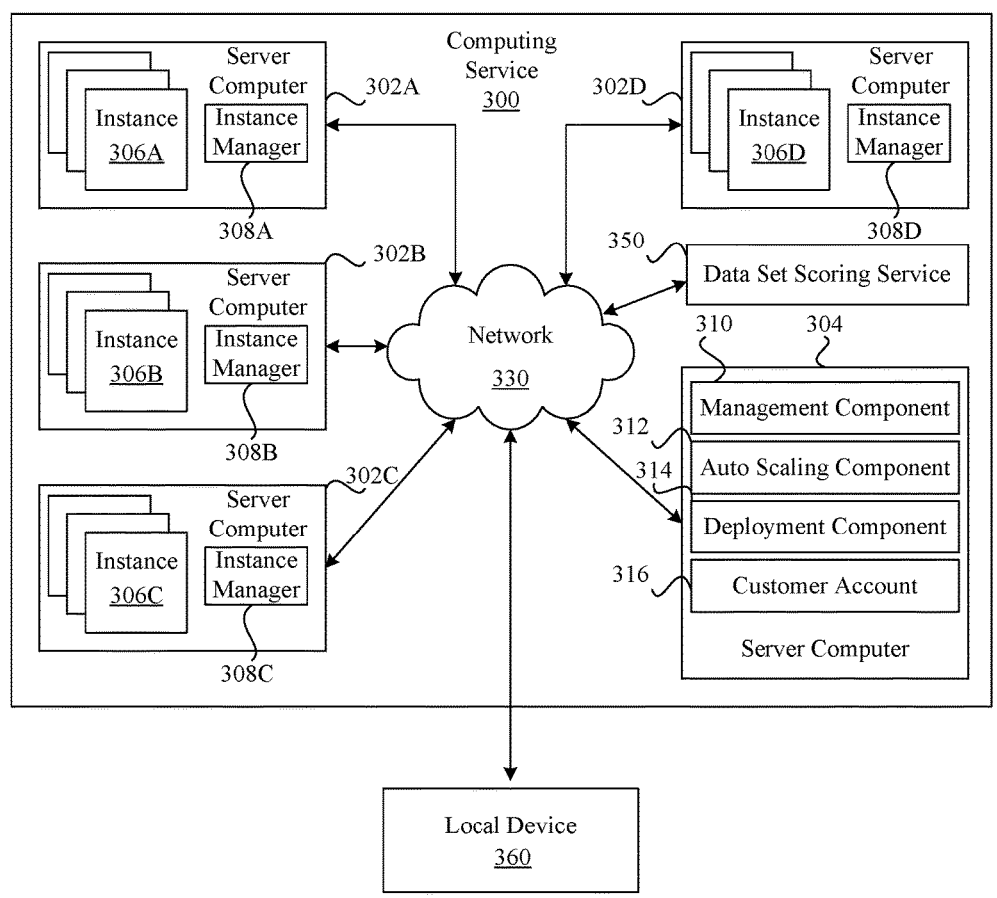
FIG. 3 is a diagram that illustrates an example of computing service having a data set scoring service in an example of the data scoring technology.

The data set scoring technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, a data set scoring service 350 may be provided for managing analysis and scoring of data sets received from data providers and made available through a data marketplace. In one example, the data set scoring service may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
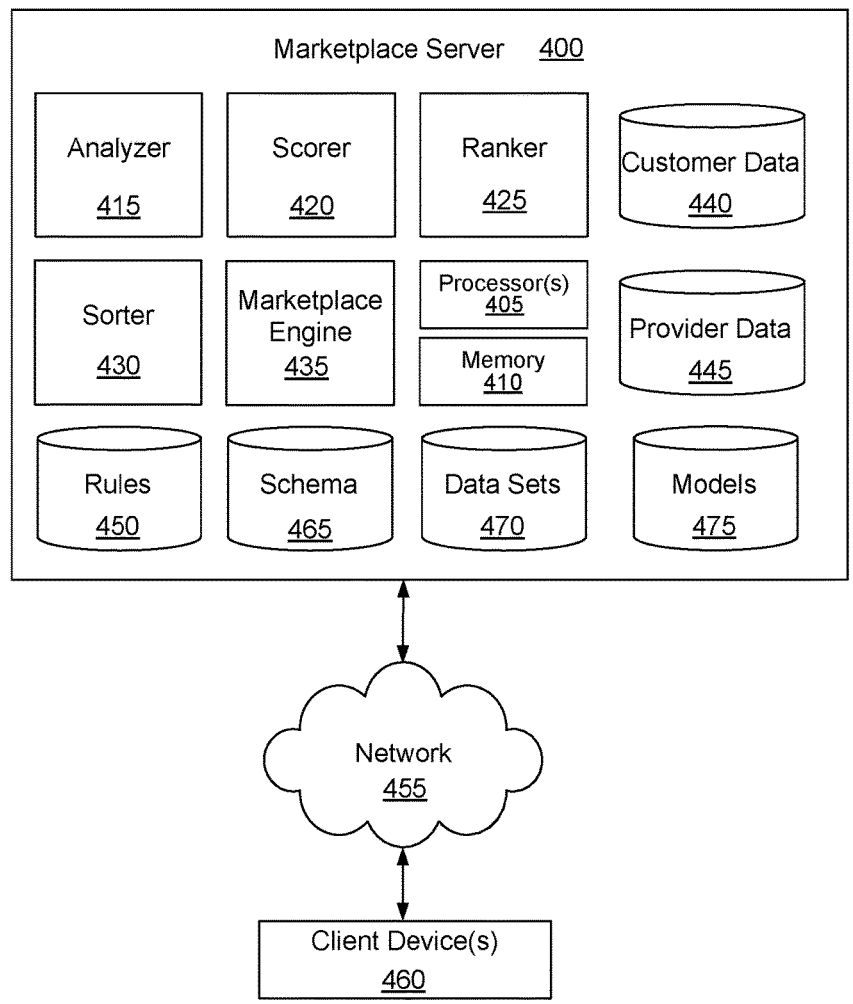
FIG. 4 is a block diagram illustrating example data sets, associated metadata, and scoring functionality in an example of the technology.

Referring now to FIG. 4, a block diagram of a system in a service provider environment for data set scoring is illustrated in accordance with an example of the present technology. The system elements may be implemented using one or more computing devices in a service provider environment, such as a marketplace server 400 or marketplace service as an example computing device, as well as client devices 460 which may be external to the service provider environment, and may be accessed across a network 455. The system may include one or more data stores 440, 445, 450, 465, 470, 475 and a number of modules or services 415, 420, 425, 430, 435 as part of a data set scoring service.

The marketplace server(s) 400 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 3.

The marketplace server 400 may include an analyzer 415. The analyzer 415 may analyze a plurality of characteristics of a data set. One or more characteristics of the data set may be independent of the data values. Using an example where the data set includes binary data values 1 and 0, determining freshness does not rely on the binary value being a 1 or a 0 but simply when the data value was last updated, whatever that value may have been or may be currently. The analyzer 415 may iterate over data values and columns or rows in the data set at periodic intervals. The analyzer 415 may determine a quality of the data values based on a number of rows in the data set relative to a number of columns in the data set. The analyzer 415 may fill in empty data values to increase the characteristic score assigned by the scorer for one of the plurality of different characteristics.

The marketplace server 400 may include a scorer 420. The scorer 420 may assign characteristic scores to the plurality of characteristics of the data set and to assign a data set score to the data set based on the characteristic scores. The scorer 420 may store the data set score and the characteristic scores together with the data set in the data sets data store 470. The scores may optionally be stored as part of metadata associated with or stored with the data set.

The marketplace server 400 may include a ranker 425. The ranker 425 may rank the data set against a plurality of other data sets based on at least one of the characteristic scores or based on the data set score. The marketplace server 400 may also include a sorter 430. The sorter 430 may sort the data set and the plurality of other data sets based on the rank and filter criteria. The ranker and sorter may be particularly useful in a data marketplace. Accordingly, the marketplace server 400 may include, provide or enable a marketplace engine 435 for providing a data marketplace. The data marketplace may provide the data set and the plurality of other data sets for access through the data marketplace based on the sorting and ranking provided by the ranker 425 and sorter 430.

The marketplace server 400 may include or be in communication with various data stores. For example, a customer data store 440 may store customer account data, purchase information, and the like. A provider data store 445 may store data provider information, such as an identity of the provider, a history of data provided, a data provider score, etc. A rules data store 450 may store rules for use by the analyzer 415, scorer 420, etc. in analyzing, scoring and/or otherwise processing or managing data sets stored in the data sets data store 470. A schema data store 465 may store schemas associated with data sets in the data sets data store 470. The schemas may optionally be stored together with the data sets and/or in the metadata for the data sets. The data sets data store 470 may include the data sets made available through the marketplace as well as the scores, metadata, and/or any other useful data set information. Also, as shown in FIG. 1, the metadata may be stored in a metadata store (106) separate from the data sets data store 470. A models data store 475 may also be included to store data about machine learning models that may be used with the dataset. The models data store 475 may store baseline machine learning models for the dataset. As described previously, the analyzer 415 may also generate one or more models to look for consistent fluctuations of data within a range, to determine whether there have been major shifts at any point in time, etc. Any such models generated may be stored in the models data store 475 to be made available to the customer through the marketplace engine 435.

Client devices 460 may be available to access and interact with the server 400 in a computing service provider environment or one or more computing instances or clusters, over a network 455. Example client devices 460 may include, but are not limited to, a desktop computer, a laptop, a tablet, a mobile device, a television, a cell phone, a smart phone, a hand held messaging device, heads up display (HUD) glasses or any device with a display that may receive and present the message content.

A service provider environment may be implemented across one or more computing device(s) connected to a network 455 to host the market place server(s) 400. For example, a computing device may include a data store and various engines and/or modules such as those described above and such modules may be executable by a processor 405 of the computing device. The system may be implemented as a plurality of computing nodes or computing instances, each of which comprises at least one processor 405 and a memory 410, where the computing nodes are configured to collectively implement the modules, data stores and so forth.

The modules that have been described may be stored on, accessed by, accessed through, or executed by a computing device. The computing device may comprise, for example, one or more processors 405 and one or more memory modules 410. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks. In one example, the network 455 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
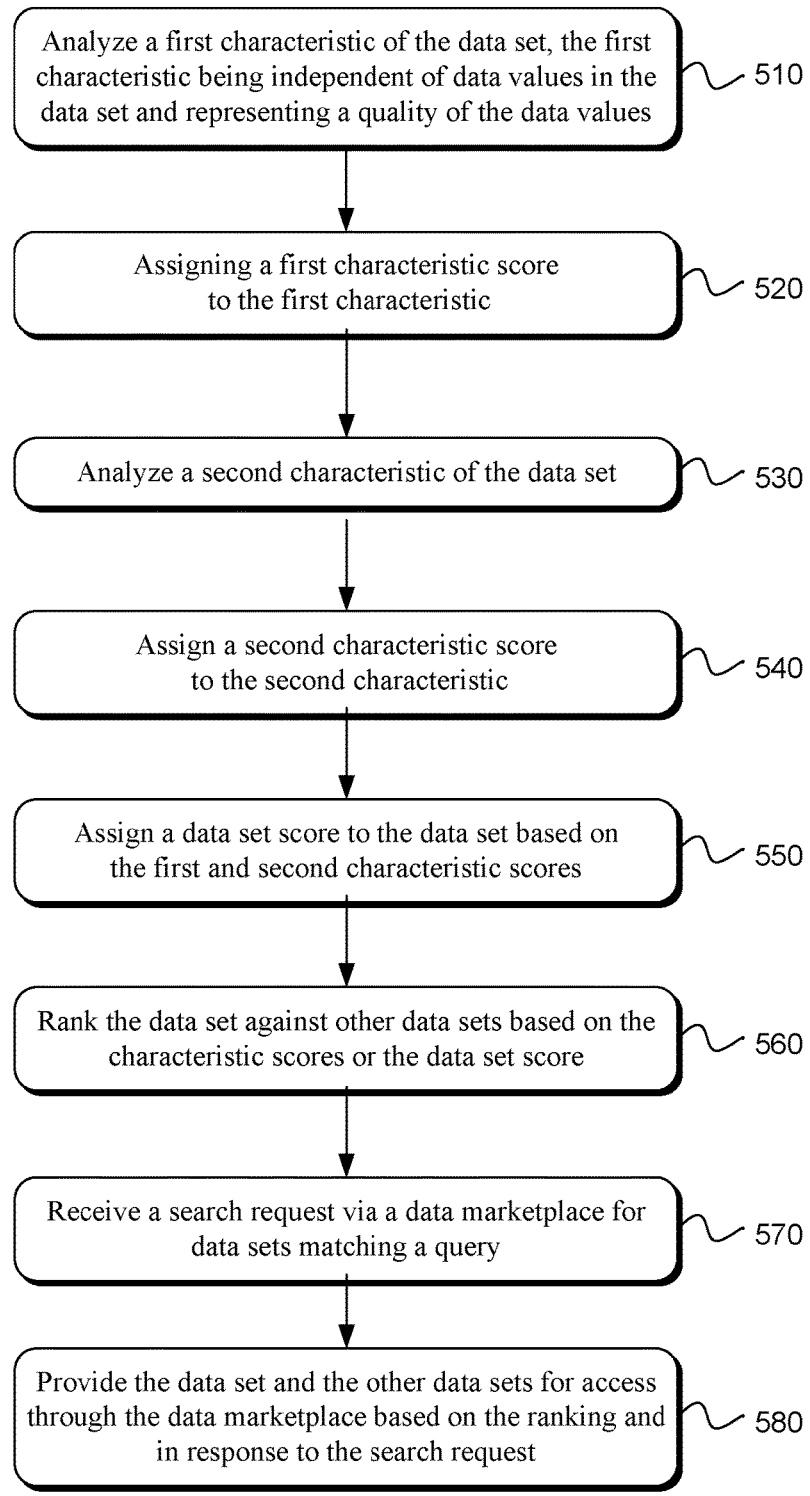
FIG. 5 is a flow chart diagram that illustrates an example method for requesting a data set using a data marketplace.
Figure 6:
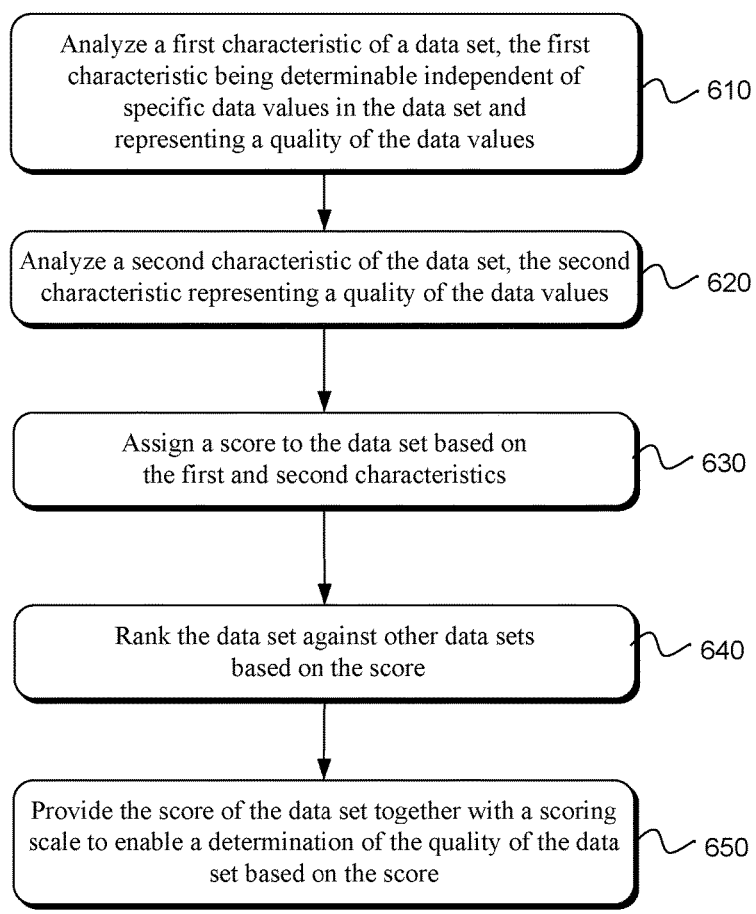
FIG. 6 is a flow chart illustrating an example method for scoring a data set.

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for ranking a data set in search results. The method may include analyzing 510, 530 first and second characteristics of the data set, each of the first and second characteristics representing a quality of data values in the data set. At least the first characteristic may be independent of the data values. The method may include assigning 520 a first characteristic score to the first characteristic and assigning 540 a second characteristic score to the second characteristic. The method may also include assigning 550 a data set score to the data set based on the first and second characteristic scores. The data set may be ranked 560 against any number of other data sets based on at least one of the scores (i.e., the first characteristic score, the second characteristic score or the data set score). A search request may be received 570 via a data marketplace for data sets matching a query. The data set and the other data sets may be provided 580 for access through the data marketplace based on the ranking and in response to the search request.

In one example, the first or second characteristic may include one or more of completeness, dimensionality or freshness characteristics. Completeness indicates a proportion of entries in at least a portion the data set that are missing data values. Dimensionality indicates a number of columns relative to a number of rows in the data set. Freshness indicates at least one of a frequency of updates to the data set or an amount of time since a latest update to the data set. Other example characteristics may include one or more of consistency, predictiveness, conformity, schema, or uniqueness. Consistency indicates a degree of consistency of a data schema across a plurality of dataset snapshots. Predictiveness indicates one or more of: a number of categorical attributes relative to text attributes in the data set, variance of numerical attributes in the data set, or correlation across attributes in the data set. Conformity indicates how well the data values conform to the data schema. Schema indicates a number of free-from attributes relative to a number of numerical attributes relative to a number of categorical attributes in the data schema. Uniqueness indicates a number of unique data values in the data set. Yet other example characteristics that may be considered include one or more of data provider quality, data set consumability or machine learning adaptability. Data provider quality is calculated based on previous scores of other datasets provided by a provider of the data set. Dataset consumability is calculated based on a number of customers who use the dataset. Machine learning adaptability is calculated based on a number of machine learning solutions that use the dataset.

In one example, the search request includes a request to filter the data set and the other data sets based on a threshold value for one of the first characteristic score, second characteristic score or data set score.

In one example, each of the other data sets may include scores based on the first or second characteristic, and optionally additional characteristics as well. The method may include providing the data set and the plurality of other data sets for access through the data marketplace based on the ranking and in response to the search request. The method may further include providing an identifier of the data set and the plurality of other data sets together with the first characteristic score, the second characteristic score or the data set score for the data set and with at least one of the scores for each of the plurality of other data sets. The method may also include providing a scoring scale for the first characteristic score, the second characteristic score or the data set score for the data set or at least one of the scores for each of the other data sets to be compared against.

In some examples, this or other methods described herein may be implemented wholly or partially as computer readable program code executed by a processor and the computer readable code may be embodied on a non-transitory computer usable medium.

Referring now to FIG. 6, a flow diagram is illustrated for a data set scoring method. In this example, the method may method include analyzing 610, 620 first and second characteristics of a data set. The first and second characteristics represent a quality of data values in the data set. At least the first characteristic is independent of the data values in the data set. The method may further include assigning 630 a score to the data set based on the first and second characteristics. The score may be a numeric or alphanumeric value or any form of suitable qualitative grade. The data set may be ranked 640 against a plurality of other data sets based on the score. The score of the data set may be provided 650 together with a scoring scale to enable a determination of the quality of the data values based on the score.

In one example, the method may include analyzing the first or second characteristics in view of the data set as a whole or in its entirety. Additionally, or as an alternative, the method may include analyzing the first or second characteristics in view of individual segments of the data set. The analysis, scoring, ranking, etc. may be performed autonomously by a computer and without human intervention. Whereas conventional technologies have involved extensive time commitment by human analysts to determine the quality of a data set and the fitness of that data set for a particular purpose, the present technology analyzes specific aspects of a data set individually and assigns the score autonomously to reduce the time and difficulty involved in the conventional methods and to enable searching, filtering and the like of data sets in a data marketplace.

In one example, the method may further include ranking the data set against other data sets based on the score in a data marketplace. For example, the score may be used in filtering and sorting the various data sets available in the data marketplace. The data set as a whole may be assigned the score as a single representative score. Alternatively or in addition, multiple characteristic scores may be assigned to the data set as a whole based on the first and second characteristics. An individual row or column in the data set may be assigned the score as a single representative score. Alternatively or in addition, multiple characteristic scores may be assigned to the individual row or column based on the first and second characteristics of that row or column.

In one example of the method, the first characteristic is selected from one or more of completeness, dimensionality or freshness characteristics. The second characteristic may be selected from a different one or more of completeness, dimensionality or freshness than the first characteristic. As set forth above, completeness indicates a proportion of entries in at least a portion the data set that are missing data values; dimensionality indicates a number of columns relative to a number of rows in the data set; and freshness indicates at least one of a frequency of updates to the data set or an amount of time since a latest update to the data set.

The method may include modifying the score. The score may be modified based on at least one of data provider quality, data set consumability or machine learning adaptability. Data provider quality may be calculated based on previous scores of other datasets provided by a provider of the data set. In other words, data provider quality may Dataset consumability may be calculated based on a number of customers who use the dataset. Machine learning adaptability may be calculated based on a number of machine learning solutions that use the dataset. The modification of the score may be an increase or a decrease by a predetermined amount based on the data provider quality, data set consumability or machine learning adaptability. For example, if previous data sets provided by the data provider have been of low quality, the score may be adjusted downward by a set number of points or by a set percentage, etc. If a large number of customers use the data set (where 'large number' is a predefined number, such as '20', '50', '100', '1000' or the like), then the score may be adjusted upwards. Regarding machine learning adapatability, the more machine learning methods are able to use the data set, the higher the score may be adjusted. For example, the score may be increased higher for adaptability to five different machine learning methods than a different data set which is adaptable to a single machine learning method. Similarly, the data provider quality may be adjusted per previous data set (and/or subsequent data set) submitted by the data provider, and the data set consumability score may be adjusted for each increase/decrease in number of customers using the data set.

The method may include identifying types of the machine learning solutions that use the data set. These identified machine learning types may be valuable for use with the data set. Accordingly, when providing data sets in the data marketplace for display, such as via a web page, the method may include providing identification of the types of the machine learning solutions together with the score of the data set. At a glance, a customer or potential customer may see the information that is useful in making a decision of which data set to use.

The method may include identifying a source of the data value or a type of the data values and determining whether freshness or consistency of the data values is a positive attribute for the source or the type of data values. When the freshness or the consistency is the positive attribute the score may be increased. When the freshness or the consistency is the negative attribute the score may be decreased. For some data sets or for some data values within a data set, freshness or consistency may be desirable or undesirable. For example, some services may rely on the latest data (i.e., the freshest data) to accurately provide the service. However, if the data in question represents errors or failures of some system, more frequent updates to the data set may indicate a greater number of errors or failures, which may be undesirable. Similarly with consistency, some services may rely on substantially consistent data to provide an accurate interpretation of the data or alternatively may rely on inconsistency as an indicator of lack of stagnation. In these examples, greater or lesser consistency may be a positive or negative attribute.

Figure 7:
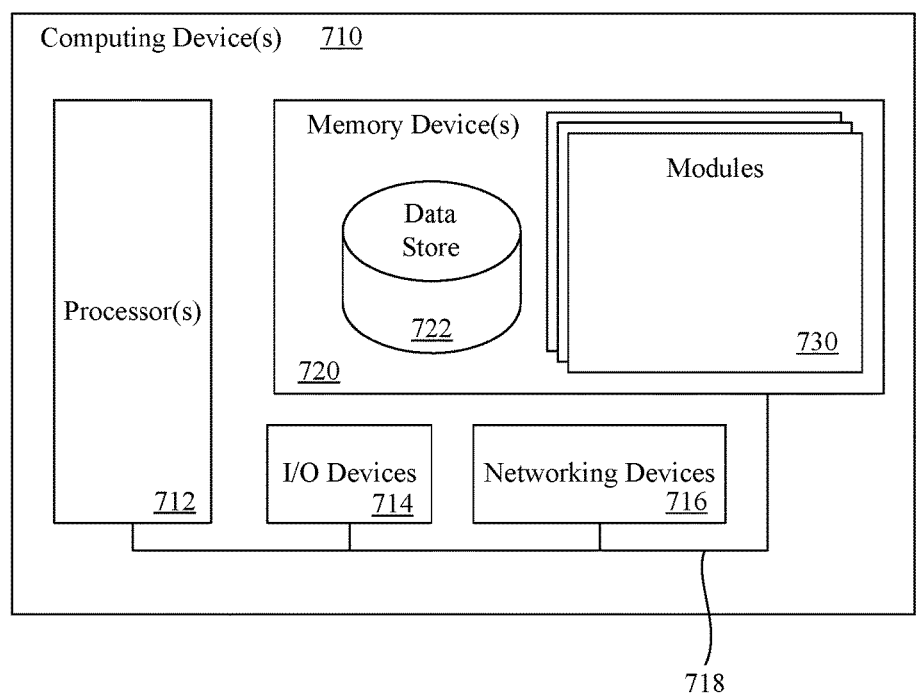
FIG. 7 is block diagram illustrating an example of a computing device that may be used to execute a method for scoring and distributing a data set within a networked environment.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method, comprising:
analyzing a first characteristic of a data set using a set of rules to evaluate suitability for machine learning models, the first characteristic being independent of data values in the data set and representing a quality of the data values;
assigning a first characteristic score to the first characteristic using the set of rules;
analyzing a second characteristic of the data set using the set of rules;
assigning a second characteristic score to the second characteristic using the set of rules;
assigning a data set score to the data set based on the first and second characteristic scores;
ranking the data set as suitable to use with a machine learning model against a plurality of other data sets based on at least one of the first characteristic score, the second characteristic score or the data set score;
receiving a search request for data sets suitable for the machine learning model, which match a query received from a client device; and
providing, using an electronic page, the data set and the plurality of other data sets for access by the client device through the electronic page based in part on the ranking and in response to the search request to compare the quality of the data set against the plurality of other data sets;
providing a uniform resource locator (URL) for the data set to the client device after one or more data sets are selected from the electronic page, wherein the URL includes authentication credentials; and
verifying the authentication credentials in the URL to determine access to the data set, in response to receipt of the URL.

2. The method of claim 1, further comprising:
selecting the first characteristic from at least one of completeness, dimensionality or freshness characteristics; wherein
completeness indicates a proportion of entries in at least a portion the data set that are missing data values;
dimensionality indicates a number of columns or attributes relative to a number of rows or values in the data set; and
freshness indicates at least one of a frequency of updates to the data set or an amount of time since a latest update to the data set.

3. The method of claim 1, further comprising:
selecting the second characteristic from at least one of consistency, predictiveness, conformity, schema or uniqueness characteristics; wherein
consistency indicates a degree of consistency of a data schema across a plurality of dataset snapshots;
predictiveness indicates one or more of: a number of categorical attributes relative to text attributes in the data set, variance of numerical attributes in the data set, or correlation across attributes in the data set;
conformity indicates how well the data values conform to the data schema;
schema indicates a number of free-form attributes relative to a number of numerical attributes relative to a number of categorical attributes in the data schema; and
uniqueness indicates a number of unique data values in the data set.

4. The method of claim 1, wherein the search request comprises a request to filter the data set and the plurality of other data sets based on a threshold value for one of the first characteristic score, the second characteristic score or the data set score.

5. The method of claim 1, wherein:
each of the plurality of other data sets includes a plurality of scores based on the first characteristic or the second characteristic;
providing the data set and the plurality of other data sets for access through the electronic page based on the ranking and in response to the search request which comprises:
providing an identifier of the data set and the plurality of other data sets together with the first characteristic score, the second characteristic score or the data set score and with at least one of the plurality of scores for each of the plurality of other data sets; and
providing a scoring scale for the first characteristic score, the second characteristic score or the data set score for the data set, or the at least one of the plurality of scores for each of the plurality of other data sets, to be compared against.

6. A computer-implemented method, comprising:
analyzing a first characteristic of a data set using a set of rules to evaluate suitability for machine learning models, the first characteristic being determinable independent of data values in the data set and representing a quality of the data values;
analyzing a second characteristic of the data set using the set of rules, the second characteristic representing a quality of the data values;
assigning a score to the data set based on the set of rules analyzing the first and second characteristics;
ranking the data set score within a display provided to a client device against a plurality of other data sets based on the score;
providing the score of the data set within the display to enable a comparison of the quality of the data set against the plurality of other data sets;
providing a uniform resource locator (URL) for the data set to the client device after one or more data sets are selected from the display, wherein the URL includes authentication credentials; and
verifying the authentication credentials in the URL to determine access to the data set, in response to receipt of the URL.

7. The method of claim 6, further comprising analyzing the first or second characteristics in view of an entirety of the data set.

8. The method of claim 6, further comprising analyzing the first or second characteristics in view of an individual attribute or value of the data set.

9. The method of claim 6, wherein the score is a numeric value or a qualitative grade.

10. The method of claim 6, further comprising:
assigning the score to the data set based on predictiveness that identifies how the data set is utilized by machine learning models; wherein the score indicates relative precision of numerical entries, categorical entries, and freeform entries to make predictions by the machine learning models.

11. The method of claim 6, further comprising:
selecting the first characteristic from at least one of completeness, dimensionality or freshness characteristics; wherein
the second characteristic is selected from a different one or more of completeness, dimensionality or freshness than the first characteristic;
completeness indicates a proportion of entries in at least a portion the data set that are missing data values;
dimensionality indicates a number of columns or attributes relative to a number of rows or values in the data set; and
freshness indicates at least one of a frequency of updates to the data set or an amount of time since a latest update to the data set.

12. The method of claim 6, further comprising scoring and ranking the plurality of other data sets using a same scoring method and fully automatic.

13. The method of claim 6, further comprising:
modifying the score based on at least one of: data provider quality, data set consumability or machine learning adaptability; wherein
data provider quality is calculated based on previous scores of other datasets provided by a provider of the data set;
dataset consumability is calculated based on a number of customers who use the dataset; and
machine learning adaptability is calculated based on a number of machine learning solutions that use the dataset.

14. The method of claim 6, further comprising:
identifying types of machine learning that use the data set; and
providing identification of the types of the machine learning within the display, which are valuable for use with the data set, along with the score of the data set.

15. The method of claim 6, further comprising:
running a machine learning model on the data set to determine a machine learning adaptability score; and
adjusting the score for the data set using the machine learning adaptability score.

16. The method of claim 6, further comprising:
identifying a source of the data values or a type of the data values;
determining whether freshness or consistency of the data values is a positive attribute or a negative attribute for the source or the type of data values;
increasing the score when the freshness or the consistency is the positive attribute; and
decreasing the score when the freshness or the consistency is the negative attribute.

17. A non-transitory computer-readable medium comprising instructions which when executed by a processor cause the processor to:
analyze a plurality of independent characteristics of a data set using a set of rules to evaluate suitability for machine learning models;
assign characteristic scores to the plurality of characteristics of the data set using the set of rules;
assign a data set score to the data set using the set of rules based on the characteristic scores;
rank the data set against a plurality of other data sets based on at least one of the characteristic scores or based on the data set score;
sort the data set and the plurality of other data sets within an electronic page generated in response to a search request specifying filter criteria associated with data sets suitable for machine learning models based on at least the rank and the filter criteria; and
provide the data set and the plurality of other data sets for access through the electronic page based on the sort;

provide a uniform resource locator (URL) for the data set after one or more data sets are selected from the electronic page, wherein the URL includes authentication credentials; and verify the authentication credentials in the URL to determine access to the data, in response to receipt of the URL.

18. The non-transitory computer-readable medium of claim 17, wherein the instructions further cause the processor to iterate over the data set at periodic intervals to assign a data set score to the data set.

19. The non-transitory computer-readable medium of claim 17, wherein the instructions further cause the processor to determine a quality of the data set based on a number of rows in the data set relative to a number of columns in the data set.

20. The non-transitory computer-readable medium of claim 17, wherein the instructions further cause the processor to fill in empty data values to increase the characteristic score assigned by the scorer for one of the plurality of different characteristics.

* * * * *